United States Patent Office 2,736,742
Patented Feb. 28, 1956

2,736,742

METHOD OF PROCESSING ACID NITRATED ORGANIC PRODUCTS

Bertil Petrus Enoksson, Gyttorp, Sweden, assignor to Nitroglycerin Aktiebolaget, Gyttorp, Sweden, a company of Sweden No Drawing. Application July 8, 1954,
Serial No. 442,217

11 Claims. (Cl. 260—467)

When glycerine, glycol, benzol, sorbitol, toluol and other organic substances are nitrated by means of a mixture of nitric and sulfuric acids a crude nitration product is obtained by separating it from the residual nitrating acid. This crude product contains nitric acid—occasionally as much as 15%—and a small amount (<1%) of sulphuric acid, and is therefore generally purified by washing it with water or with water-solutions, commonly of sodium carbonate, sodium hydroxide, or ammonia. Part of the nitrated substance as well as the nitric acid dissolved in the crude product, are usually lost in this washing.

The Swedish Patent No. 72,722 (British Patent No. 362,175) describes a method of utilizing the free acids in said crude nitration product by direct neutralization of the acid by means of gaseous ammonia or ammonia dissolved in a portion of the nitration product from which the free acids have been removed by washing. Ammonium nitrate is formed, which is left in suspension in the resulting mixture to form a component of the explosive for which the nitration product is intended. Owing to difficulties of controlling the heat generated by the neutralization reaction—which unless removed by cooling may raise the temperature nearly 100° C.—and of regulating the amount of ammonia added, this method has not proved of any practical importance. Unstable products which increase the danger in storing the explosive have been found to form especially in the presence of excess of ammonia.

The present invention is a method of processing acid-containing nitrated organic products such as acid nitro-glycerine-nitroglycol, characterized in that the neutralization is effected by adding a mixture or solution of a neutralizing agent of the group consisting of ammonia and organic bases with ammonium nitrate to the crude acid-containing nitration product. When preparing an ammonia-ammonium nitrate mixture for use for neutralizing the acid nitration product the ammonia is dissolved in the ammonium nitrate, preferably at a low temperature, e. g. below 20° C., to prevent evaporation of the ammonia. The ammonia-ammonium nitrate mixture may be saturated by ammonia or it may be less than saturated. The ammonia is preferably used in the form of anhydrous or gaseous ammonia or substantially dry liquid ammonia. The ammonium nitrate used to dissolve the ammonia preferably consists of commercial crystallized ammonium nitrate. The reason for using low water content in the ammonia and in the ammonium nitrate is to limit the water content of the resulting explosive to below 1.5% of water. The use of excess of ammonia over that required for the neutralization preferably is avoided.

The organic base used instead of ammonia, together with ammonium nitrate, for neutralizing the acid nitrated organic product preferably consists of an amine or amid e. g. urea, aniline, guanidine, naphthylamine or hexamethylenetetramine. Neutralization according to this method e. g. by urea for the formation of urea nitrate, generates considerably less heat than the neutralization of nitric acid by ammonia. Moreover, urea is a common stabilizer of explosives, an excess of which does not have the unpleasant properties of ammonia, but is even desirable. To hasten the neutralization of the acids in the crude acid nitration product it is expedient to use the said bases in the form of a melted, preferably eutectic, mixture with ammonium nitrate. Regulating the amount of the mixture is easy, and the resulting explosives are very stable in storage, provided that care is taken to have a slight excess of urea.

Part of the ammonium nitrate used with the ammonia or organic base may be replaced by another nitrate, such as sodium nitrate in an amount of up to 50 per cent to obtain a lower melting point. When using urea as the neutralizing agent an eutectic mixture of 45 percent urea, 47.5 percent ammonium nitrate and 7.5 per cent sodium nitrate yields the lowest melting point.

The presence of ammonium nitrate in the neutralizing mixture reduces the temperature increase. There is no drawback in adding ammonium nitrate to the neutralizing agent, since the manufacture of most commercial explosives entail the admixture of ammonium nitrate with the nitrated product.

The rise in the temperature due to the neutralization can be still more reduced by mixing the nitrated product with ammonium nitrate, for instance in equal parts, before adding the neutralizing mixture as described above. In this way the rise in temperature due to the neutralization can be kept below 30° C.

In view of the dissolving effects of nitric acid on ammonium nitrate a commercial ammonium nitrate product without drying and crushing can be mixed with the acid nitration product. Ammonium nitrate will then become finely dispersed in the nitration product. Such fine-dispersed, partly colloidal nitrate makes a more stable suspension, and yield an explosive which is more easily pressed in cartridges, than does more coarse-grained nitrate.

The neutralization of the nitric acid in the nitration product has many advantages over the present washing process. As mentioned above, the actual yield of nitration product will be increased, and less nitric acid will be lost. The washing moreover involves a certain amount of hydrolysis of the nitric acid esters, which is avoided by the method described here.

The invention is illustrated by the following examples.

Example 1

1000 g. of a nitroglycerine crude product containing 9.4% of $HNO_3$ was mixed with 1000 g. of $NH_4NO_3$. 140 g. of a solution of 20% ammonia in ammonium nitrate was mixed with an additional 140 g. of $NH_4NO_3$. The two mixtures were kneaded together, and the temperature rose 28°. The suspension was gelatinized by the addition of 30 g. of nitrocellulose, and 200 g. of wood flour was kneaded into it. The resulting explosive had a 42% higher mortar value than pure trinitrotoluene.

Example 2

1000 g. of an acid mixture of nitroglycerine, nitroglycol and nitrosucrose containing 10% $HNO_3$ was mixed with 800 g. of ammonium nitrate and kept at 8° C. 150 g. of a solution of 20% ammonia in ammonium nitrate at 0° C. was poured into this mixture. The temperature rose to 46° C. 25 g. of nitrocellulose and 200 g. of peat powder were kneaded into the resultant suspension. The detonation speed of the explosive was 6600 m./s., and its gap test was 400 mm. Its mortar value exceeded that of pure trinitrotoluene by 40%. The Abel test gave 60 min. without reaction.

Example 3

1000 g. of acid nitroglycerine-nitroglycol containing 9.5% HNO₃ were mixed with 500 g. of ammonium nitrate and kept at 10° C. A mixture of 170 g. of ammonium nitrate, 30 g. of sodium nitrate, and 160 g. of urea, was prepared and kept at 45° C. This latter mixture was stirred into the first mixture causing the temperature to rise to 46° C. 1000 g. of ammonium nitrate, 270 g. of aluminium powder, 45 g. of wood flour, and 40 g. of nitrocellulose were kneaded into the fine-grained suspension thus obtained. The resulting explosive was easily pressed, its detonation speed was 650 m./s., and its gap test was 210 mm.

Example 4

1000 g. of an acid explosive nitration product containing 9% nitric acid at 20° C. was mixed with a mixture at 25° C. of 150 g. of ammonium nitrate, 125 g. of urea, 30 g. of hexamethylenetetramine, 7 g. of water and 3 g. of secondary sodium salt of alkyl sulphate $$R.CH(CH_3).O.SO_2.O.Na$$

R=an alkyl group of about 12 carbon atoms. The temperature rose to 54° C. The resulting suspension was suitable for gelatinizing with nitrocellulose and for having oxygen-absorbing substances kneaded into it.

Aniline, guanidine, naphthylamine and hexamethylenetetramine may be substituted in equivalent amounts and with similar results for the ammonia and urea in the foregoing examples.

Example 5

1000 g. of nitroglycerine crude product containing 9.5% HNO₃ at 20° C. was stirred into a mixture of 700 g. of ammonium nitrate and 240 g. of aniline at 20° C. The resulting suspension was used for gelatinizing with nitrocellulose and for having oxygen-absorbing substances and ammonium nitrate kneaded into it.

Example 6

1000 g. of nitroglycerine crude product containing 9.5% HNO₃ was mixed with 1000 g. of ammonium nitrate. A mixture of 200 g. of ammonium nitrate and 180 g. of hexamethylenetetramine was stirred into said mixture. The resulting suspension was suitable for gelatinizing with nitrocellulose and for having oxygen-absorbing substances kneaded into it.

Example 7

1000 g. of an acid explosive nitration product containing 9.0% nitric acid at 20° C. was mixed with a mixture of 150 g. of ammonium nitrate, 400 g. of naphthylamine and 10 g. of water. The resulting mixture was used for having oxygen-absorbing substances and ammonium nitrate kneaded into it.

Example 8

1000 g. of nitroglycerine was mixed with 1500 g. of ammonium nitrate, 300 g. of guanidine nitrate, 300 g. of wood flour, and 40 g. of nitrocellulose. The mixture was kneaded and gave a stable explosive of the same type as in Example 3. Corresponding results are to be obtained by mixing acid nitroglycerine, guanidine, ammonium nitrate, wood flour and nitrocellulose.

I claim:

1. Process which comprises at least partially neutralizing the free acid in an acid containing nitration product formed by the nitration of an organic compound with nitric acid, by the addition thereto of a mixture comprising a weight of ammonium nitrate at least equal to the weight of the free acid and an acid neutralizing agent of the group consisting of ammonia and organic bases.

2. Process as defined in claim 1 in which the acid neutralizing agent is ammonia.

3. Process as defined in claim 1 in which the acid neutralizing agent is an amine.

4. Process as defined in claim 1 in which the acid neutralizing agent is an amide.

5. Process as defined in claim 1 in which the acid neutralizing agent is urea.

6. Process as defined in claim 1 in which the acid neutralizing agent is an organic base.

7. Process as defined in claim 1 in which the acid containing nitration product is mixed with ammonium nitrate prior to the addition thereto of the mixture of ammonium nitrate and acid neutralizing agent.

8. Process as defined in claim 1 in which the mixture comprising ammonium nitrate and acid neutralizing agent contains another inorganic nitrate.

9. Process as defined in claim 8 in which the other nitrate is sodium nitrate.

10. Process as defined in claim 1 in which the mixture comprising ammonium nitrate and acid neutralizing agent comprises an eutectic mixture of ammonium nitrate, urea and sodium nitrate.

11. Process as defined in claim 1 in which the acid neutralizing agent is urea and is added in excess of the quantity necessary to effect neutralization.

References Cited in the file of this patent

UNITED STATES PATENTS 2,294,849     Olin et al. _____ Sept. 1, 1942

FOREIGN PATENTS 362,175     Great Britain _____ Dec. 3, 1931